US012137332B2

(12) United States Patent
Lee

(10) Patent No.: US 12,137,332 B2
(45) Date of Patent: Nov. 5, 2024

(54) AUDIO DEVICE AND OPERATION METHOD THEREOF

(71) Applicant: LG ELECTRONICS INC., Seoul (KR)

(72) Inventor: Myoungcheol Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 176 days.

(21) Appl. No.: 17/791,140

(22) PCT Filed: Dec. 10, 2020

(86) PCT No.: PCT/KR2020/018027
§ 371 (c)(1),
(2) Date: Jul. 6, 2022

(87) PCT Pub. No.: WO2021/141248
PCT Pub. Date: Jul. 15, 2021

(65) Prior Publication Data

US 2023/0050136 A1 Feb. 16, 2023

(30) Foreign Application Priority Data

Jan. 6, 2020 (KR) ........................ 10-2020-0001647

(51) Int. Cl.
*H04R 5/04* (2006.01)
*H04R 3/04* (2006.01)
*H04R 29/00* (2006.01)

(52) U.S. Cl.
CPC ................. *H04R 5/04* (2013.01); *H04R 3/04* (2013.01); *H04R 29/004* (2013.01)

(58) Field of Classification Search
CPC .......... H04R 5/04; H04R 3/04; H04R 29/004; H04R 3/005; H04S 7/301; H04S 3/002; H04S 7/302; H04S 2420/11
USPC ...................................................... 381/59, 96
See application file for complete search history.

(56) References Cited

U.S. PATENT DOCUMENTS

2011/0091055 A1 4/2011 LeBlanc
2011/0268285 A1 11/2011 Ohta et al.
2013/0058492 A1* 3/2013 Silzle .................. H04R 29/002 381/59
2015/0016642 A1* 1/2015 Walsh ..................... H04S 7/301 381/307
2015/0172814 A1* 6/2015 Usher .................... H04R 3/005 381/92

(Continued)

FOREIGN PATENT DOCUMENTS

JP 2018-182534 A 11/2018
KR 10-2019-0084106 A 7/2019

*Primary Examiner* — Xu Mei
(74) *Attorney, Agent, or Firm* — Birch, Stewart, Kolasch & Birch, LLP

(57) ABSTRACT

The present disclosure relates to an audio device and an operation method thereof. The audio device may include a speaker; a plurality of microphones spaced a predetermined distance apart from each other; and controller. The controller controls the plurality of microphones to receive audio output from an external audio device, determines a location of the external audio device on the basis of signals received from the plurality of microphones and adjusts a setting for an audio output from at least one of the external audio device and the speaker, based on the location of the external audio device.

14 Claims, 8 Drawing Sheets

(56) References Cited

U.S. PATENT DOCUMENTS

| | | | | |
|---|---|---|---|---|
| 2016/0309276 | A1* | 10/2016 | Ridihalgh | G06F 3/165 |
| 2018/0136898 | A1 | 5/2018 | Shi et al. | |
| 2018/0302711 | A1 | 10/2018 | Katayama | |

* cited by examiner

AUDIO DEVICE AND OPERATION METHOD THEREOF

CROSS-REFERENCE TO RELATED APPLICATIONS

This application is the National Phase of PCT International Application No. PCT/KR2020/018027, filed on Dec. 10, 2020, which claims priority under 35 U.S.C. 119(a) to Korean Patent Application No. 10-2020-0001647, filed in the Republic of Korea on Jan. 6, 2020, all of which are hereby expressly incorporated by reference into the present application.

TECHNICAL FIELD

The present disclosure relates to an audio device and an operating method thereof.

BACKGROUND ART

A multimedia system includes a display device that displays an image that a user can watch, an audio device that outputs audio corresponding to the image, and the like.

Recently, there is a worldwide trend of converting from analog broadcasting to digital broadcasting, and user demand for an audio device capable of enjoying rich stereophonic sound along with a high-definition screen of digital broadcasting is increasing.

In particular, an audio system that improves sound quality by outputting audio in various sound ranges through a plurality of speakers is widely used. For example, the audio system may include a woofer outputting audio in a low range, a midrange outputting audio in a mid-range, and a tweeter outputting audio in a high range.

Meanwhile, set values for the audio output of an audio device are basically optimized and preset according to acoustic characteristics, but the audio device may not be able to provide sound of a quality satisfactory to a user depending on the installation location and various surrounding environments. For example, the sound quality provided to a user may vary due to differences in the size of the installation location, the degree of sound absorption according to the material of a floor or wall, and the location and direction of each of a plurality of speakers.

Conventionally, a method of disposing an external microphone at a user's listening position and adjusting a setting value for an audio output based on audio received through the external microphone is used.

However, according to the conventional method, there is an inconvenient that a user must be provided with a separate external microphone in addition to the audio device, and there is also the problem of having to adjust the setting value for an audio output by using the external microphone whenever the location or direction of a plurality of speakers is changed.

DISCLOSURE

Technical Problem

The present disclosure has been made in view of the above problems, and provides an audio device capable of determining a location of an external audio device by using a built-in microphone provided in the audio device, and adjusting a setting value for an audio output, and an operating method thereof.

Technical Solution

An audio device according to an embodiment of the present disclosure includes at least one speaker; a plurality of microphones; and a controller, wherein the controller controls the plurality of microphones to receive audio output from an external audio device, determines a location of the external audio device on the basis of signals received from the plurality of microphones, and adjusts a setting for an audio output from at least one of the external audio device and the at least one speaker, on the basis of the location of the external audio device.

Meanwhile, a method of operating an audio device according to an embodiment of the present disclosure includes receiving an audio output from an external audio device, through a plurality of microphones included in the audio device; determining a location of the external audio device, on the basis of the audio received through the plurality of microphones; and adjusting a setting for an audio output from at least one of the external audio device and the at least one speaker included in the audio device, on the basis of the location of the external audio device.

Advantageous Effects

Effects of an audio device and an operating method thereof according to the present disclosure will be described as follows.

According to at least one embodiment of the present disclosure, even if an external microphone is not separately provided, the location of the external audio device can be determined by using a plurality of microphones built in the audio device, and the settings for the audio output can be precisely adjusted in consideration of the location of the external audio device, thereby improving the product price competitiveness and ease of use.

Further scope of applicability of the present disclosure will become apparent from the following detailed description. However, it should be understood that the detailed description and specific embodiments such as preferred embodiments of the present disclosure are given by way of illustration only, since various changes and modifications within the spirit and scope of the present disclosure may be clearly understood by those skilled in the art.

MODE FOR INVENTION

Figure 1:
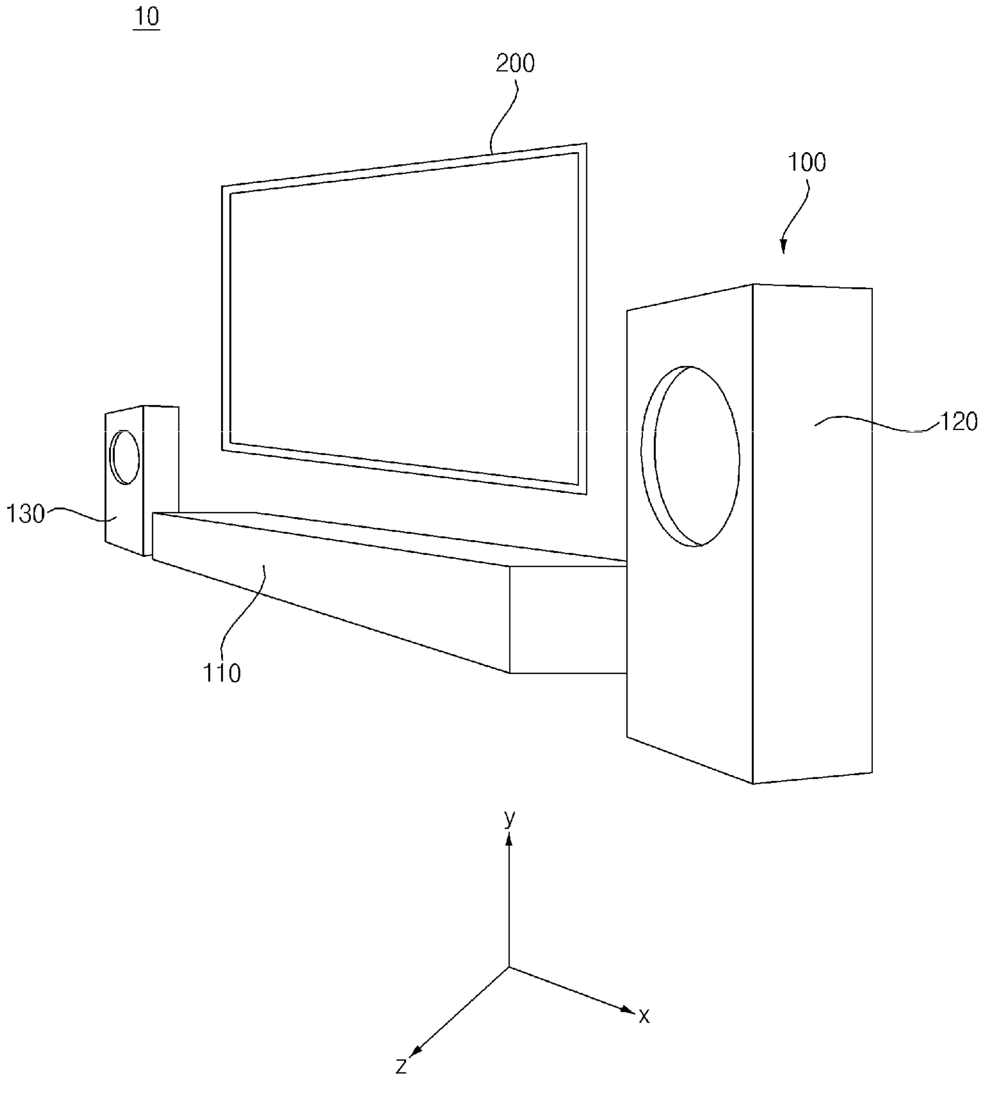
FIG. 1 is a diagram illustrating a multimedia system according to an embodiment of the present disclosure.

Hereinafter, the present disclosure will be described in detail with reference to the drawings. In the drawings, in order to clearly and briefly describe the present disclosure, the illustration of parts irrelevant to the description is omitted, and the same reference numerals are used for the same or extremely similar parts throughout the specification.

Suffixes such as "module" and "unit" used in the description below may be used to refer to elements or components. Use of such suffixes herein is merely intended to facilitate description of the specification, and the suffixes do not have any special meaning or function. Accordingly, the terms "module" and "unit" may be used interchangeably.

In the present application, it should be understood that the terms "comprises, includes," "has," etc. specify the presence of features, numbers, steps, operations, elements, components, or combinations thereof described in the specification, but do not preclude the presence or addition of one or more other features, numbers, steps, operations, elements, components, or combinations thereof.

In addition, in this specification, although the terms first, second, etc. may be used herein to describe various elements, these elements should not be limited by these terms. These terms are only used to distinguish one element from another.

Figure 2:
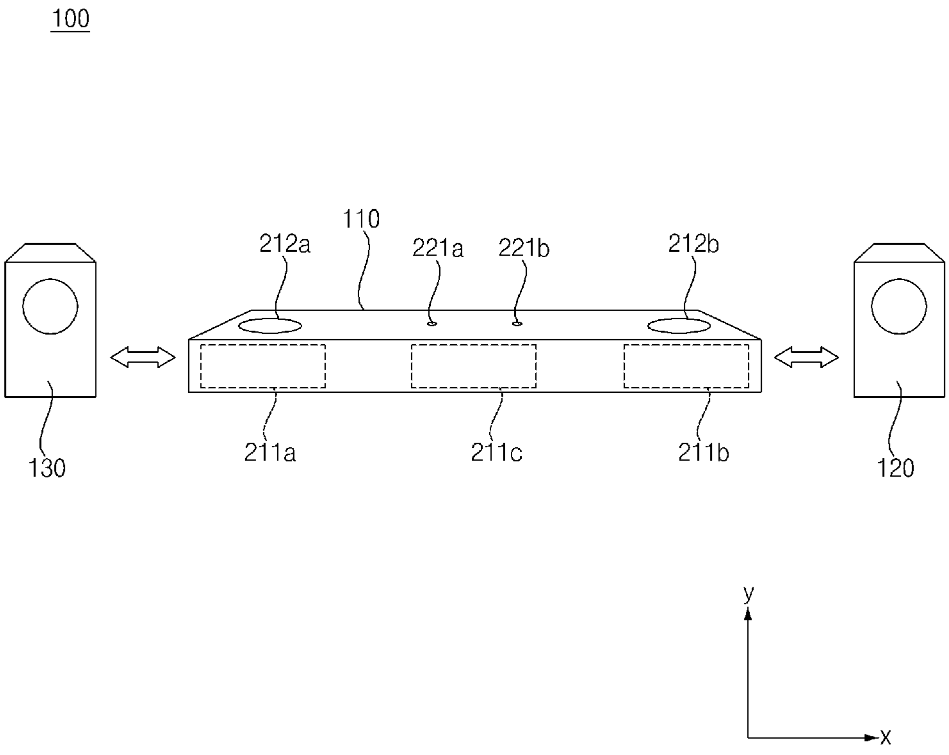
FIG. 2 is a diagram illustrating an audio system of FIG. 1.

FIG. 1 is a diagram illustrating a multimedia system according to an embodiment of the present disclosure, and FIG. 2 is a diagram illustrating an audio system of FIG. 1.

Referring to FIGS. 1 and 2, a multimedia system 10 may include an audio system 100 and/or an image display device 200.

The audio system 100 may include a main audio device 110 and/or a sub audio device 120, 130. In this drawing, although the main audio device 110 is illustrated as a sound bar in the form of a bar extending long in a length direction, the present disclosure is not limited thereto.

The main audio device 110 may include at least one speaker 211*a* to 212*b*. At least one speaker 211*a* to 212*b* may include a diaphragm (not shown) that generates vibration by a signal.

A direction parallel to the length direction of the main audio device 110 may be referred to as a +x-axis direction, a −x-axis direction, a left direction, or a right direction. A direction in which a front speaker 211*a* to 211*c* outputs audio may be referred to as a +z axis, a front side direction, or a forward direction, and a direction opposite to the direction in which the front speaker 211*a* to 211*c* outputs audio may be referred to as a −z axis, a rear side direction, or a rearward direction. A height direction of the main audio device 110, i.e., a direction parallel to the direction in which an upper speaker 212*a* and 212*b* outputs audio may be referred to as a +y-axis direction, a −y-axis direction, an upward direction or a downward direction.

The main audio device 110 may output audio in a plurality of directions through at least one speaker 211*a* to 212*b*. For example, the main audio device 110 may output audio forward through the front speaker 211*a* to 211*c*, or may output audio upward through the upper speaker 212*a* and 212*b*.

The main audio device 110 may include a plurality of microphones 221*a* and 221*b*, and may receive audio through the plurality of microphones 221*a* and 221*b*. For example, the main audio device 110 may receive a voice command from a user through the plurality of microphones 221*a* and 221*b*.

Each of sub audio devices 120 and 130 may include at least one speaker (not shown). For example, the sub audio device 120, 130 may include a speaker that is the same as/similar to at least one speaker 211*a* to 212*b* included in the main audio device 110.

The sub audio device 120, 130 may include a passive radiator (not shown). The passive radiator may mean a unit used together with a woofer to enhance an audio output of a low frequency range.

The sub audio device 120, 130 may be formed to be detachable from the main audio device 110.

The sub audio devices 120 and 130 may be respectively coupled to opposite ends of the main audio device 110. In this case, the sub audio device 120, 130 may be structurally coupled to a detachable portion (not shown) formed in opposite ends of the main audio device 110, or may be coupled by using magnetism.

The sub audio device 120, 130 may be separated from opposite ends of the main audio device 110 to output audio in different directions. For example, any one of the sub audio devices 120 and 130 may be disposed to output audio in a forward direction, and the other one may be disposed to output audio in an upward direction.

The main audio device 110 and the sub audio device 120, 130 may be communicatively connected to each other by wired/wirelessly. For example, the main audio device 110 and the sub audio device 120, 130 may be connected by wire through a cable, or wirelessly through Bluetooth.

The sub audio device 120, 130 may output audio, based on an audio signal received from the main audio device 110.

The image display device 200 may be a device that processes and outputs an image. The image display device 200 is not particularly limited as long as it can output a screen on which an image is displayed, such as a television (TV), a notebook computer, a smart phone, and a tablet computer.

The image display device 200 may receive a broadcast signal, process it, and output a signal-processed broadcast image. When the image display device 200 receives a broadcast signal, the image display device 200 may correspond to a broadcast reception device. In this case, the image display device 200 may receive a broadcast signal wirelessly through an antenna, or may receive a broadcast signal by wire through a cable. For example, the image display device 200 may receive a terrestrial broadcast signal, a satellite broadcast signal, a cable broadcast signal, an Internet Protocol Television (IPTV) broadcast signal, and the like.

The image display device 200 may transmit/receive a signal including data to and from the audio system 100 through wired/wireless communication. For example, the image display device 200 may transmit an audio signal corresponding to an image output through a screen to the main audio device 110.

Figure 3:
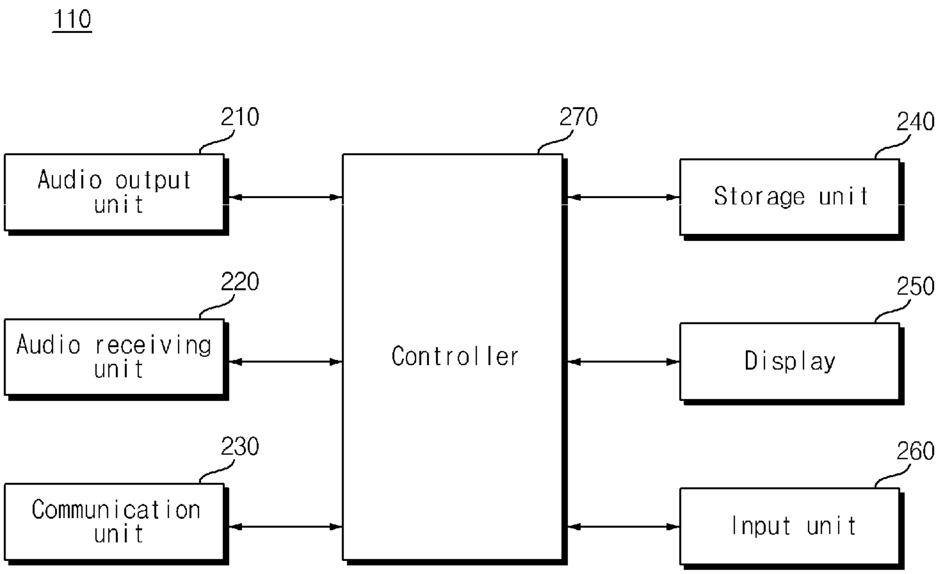
FIG. 3 is an internal block diagram of an audio device of FIG. 2.

FIG. 3 is an internal block diagram of the main audio device of FIG. 2.

The main audio device 110 may include an audio output unit 210, an audio receiving unit 220, a communication unit 230, a storage unit 240, a display 250, an input unit 260 and/or a controller 270.

The audio output unit 210 may include at least one speaker 211*a* to 212*b*. For example, the audio output unit 210 may receive an audio signal processed by the controller 270, and output the audio.

The audio receiving unit 220 may include a plurality of microphones 221*a* and 221*b*. The plurality of microphones 221*a* and 221*b* may be disposed to be spaced apart from each other by a certain separation distance. For example, the plurality of microphones 221*a* and 221*b* may be disposed to be symmetrical based on a front center speaker 221*c*. Meanwhile, although FIG. 2 illustrates that the main audio device 110 includes two microphones 221*a* and 221*b*, the present disclosure is not limited thereto, and three or more microphones may be provided.

The communication unit 230 may transmit/receive a signal including data to/from an external device and, for this purpose, may include at least one communication module.

The communication unit 230 may transmit/receive a signal by using a wireless communication method such as Wi-Fi, Bluetooth, and Zigbee, as well as a wired communication method such as High Definition Multimedia Interface (HDMI), and optical cable communication.

For example, the communication unit 230 may transmit the audio signal processed by the controller 270 to an external audio device (e.g. sub audio device 120, 130).

For example, the communication unit 230 may receive a user input signal such as power on/off and volume setting from a remote control device (not shown) such as a remote control, and transmit the received signal to the controller 270.

The storage unit 240 may store a program for processing and controlling each signal in the controller 270, or may store a signal-processed voice or data signal.

For example, the storage unit 240 may store application programs designed for the purpose of performing various tasks that can be processed by the controller 270, and may selectively provide some of the stored application programs, upon request of the controller 270.

The program stored in the storage unit 240 is not particularly limited as long as it can be executed by the controller 270.

The storage unit 240 may perform a function for temporarily storing an audio or data signal received from an external device through the communication unit 230.

FIG. 3 illustrates an embodiment in which the storage unit 240 is provided separately from the controller 270, but the scope of the present disclosure is not limited thereto, and the storage unit 240 may be included in the controller 270.

The display 250 may output a message related to the operating state of the main audio device 110. For example, the display 250 may output a message related to a volume state, a power state, and the like of the main audio device 110. Meanwhile, the audio device 110 may further include a display device such as a light emitting diode (LED).

The input unit 260 may include an input device (e.g. a key, a touch panel, etc.) capable of receiving a user input. The input unit 260 may transmit a command corresponding to the received user input to the controller 270.

The controller 270 may be connected to each component included in the main audio device 110 to control the overall operation of each component.

The controller 270 may include at least one processor. Here, the processor may be a general processor such as a central processing unit (CPU). Obviously, the processor may be a dedicated device such as an ASIC or other hardware-based processor.

The controller 270 may transmit an audio signal to the audio output unit 210 and output audio through at least one speaker 211*a* to 212*b*.

The controller 270 may receive a signal from a plurality of microphones 221*a* and 221*b* included in the audio receiving unit 220, and process the received signals.

The controller 270 may correct a reception error between the plurality of microphones 221*a* and 221*b*.

The controller 270 may output a test audio through any one of the at least one speaker 211*a* to 212*b*, and control the plurality of microphones 221*a* and 221*b* to receive the test audio while the test audio is output. In this case, the controller 270 may correct a reception error between the plurality of microphones 221*a* and 221*b*, based on a signal corresponding to the test audio received from the plurality of microphones 221*a* and 221*b*. For example, when the test audio is output through the front center speaker 221*c*, the controller 270 may compare signals corresponding to the test audio respectively received from the plurality of microphones 221*a* and 221*b* with each other, and may correct a reception error between the plurality of microphones 221*a* and 221*b* based on the comparison result, so that audio reception times of the plurality of microphones 221*a* and 221*b* coincide with each other.

The controller 270 may transmit/receive a signal to/from an external device through the communication unit 230, and may process the received signal. For example, the controller 270 may transmit an audio signal to the sub audio device 120, 130 through the communication unit 230.

The controller 270 may adjust the settings for audio output of the audio output unit 210 and/or the sub audio device 120, 130. At this time, in the case of the low range, compared to the mid/high range, considering that the sound quality is greatly changed by the influence of the environment in which the audio system 100 is installed, and the deviation of the sound quality according to user's location is small, the controller 270 can first adjust the settings for audio output of a low range (e.g. a band of 200 Hz or lower) of a certain frequency or lower.

The controller 270 may adjust the settings for audio output, based on audio respectively received through the plurality of microphones 221*a* and 221*b*.

The controller 270 may transmit an audio signal for the test audio to any one of the sub audio devices 120 and 130 through the communication unit 230, and may control the plurality of microphones 221*a* and 221*b* to receive test audio output from any one of the sub audio devices 120 and 130.

Here, for convenience, the test audio for correcting a reception error between the plurality of microphones 221*a* and 221*b* may be referred to as a first test audio, and the test audio for determining the location of the sub audio device 120, 130 may be referred to as a second test audio.

The controller 270 may determine an angle between the main audio device 110 and the sub audio device 120, 130 outputting the second test audio, based on the second test audio respectively received through the plurality of microphones 221*a* and 221*b*. For example, when the plurality of microphones 221*a* and 221*b* are disposed to be spaced apart from each other by a certain separation distance, the distances between the plurality of microphones 221*a* and 221*b* and the sub audio device 120, 130 outputting the second test audio are different from each other, and the plurality of microphones 221*a* and 221*b* receive the second test audio at different time points. In this case, the controller 270 may perform a Fourier transform on the second test audio respectively received through the plurality of microphones 221*a* and 221*b* from a time domain to a frequency domain, and may determine an angle between the main audio device 110 and the sub audio device 120, 130 outputting the second test audio, based on a phase difference between the Fourier-transformed second test audios.

The controller 270 may determine a distance between the main audio device 110 and the sub audio device 120, 130 outputting the second test audio, based on the second test audio respectively received through the plurality of microphones 221*a* and 221*b*.

The controller 270 may determine a regression equation corresponding to an angle between the main audio device 110 and the sub audio device 120, 130 outputting the second test audio, and may determine a distance between the main audio device 110 and the sub audio device 120, 130 outputting the second test audio, based on the determined regression equation. In this case, data for the regression equation corresponding to various angles may be stored in the storage unit 240. For example, the controller 270 may determine a distance between the main audio device 110 and the sub audio device 120, 130 outputting the second test audio, based on an asymptotic regression model as in Equation 1 below.

$$y=\theta_1-\theta_2\times e^{-\theta_3 x} \quad \text{[Equation 1]}$$

Here, the x value means a distance between the main audio device 110 and the sub audio device 120, 130 outputting the second test audio, the y value means a ratio between magnitudes of the audio received by each of the plurality of microphones 221*a* and 221*b*, and 01 to 03 may mean a constant determined according to an angle between the main audio device 110 and the sub audio device 120, 130 outputting the second test audio.

In this case, in order to calculate the distance between the main audio device 110 and the sub audio device 120, 130 that outputs the second test audio, the controller 270 may use Equation 2 below based on Equation 1 above.

$$x=-\frac{1}{\theta_3}\ln\frac{\theta_1-y}{\theta_2} \quad \text{[Equation 2]}$$

The controller 270 may determine the position of the sub audio device 120, 130 according to the angle and distance between the main audio device 110 and the sub audio device 120, 130 that output the second test audio.

The controller 270 may adjust the settings for audio output of the audio output unit 210 and/or the sub audio device 120, 130, based on the position of the sub audio device 120, 130.

For example, the controller 270 may transmit an audio signal for the test audio to the sub audio device 120, 130 through the communication unit 230 to adjust the settings for the audio output, and may output a corresponding test audio through the audio output unit 210. Here, for convenience, the test audio for adjusting the settings for the audio output may be referred to as a third test audio.

In this case, the controller 270 may control the plurality of microphones 221*a* and 221*b* to receive the third test audio, and may adjust the settings for audio output, based on the position of the sub audio device 120, 130 and a signal corresponding to the third test audio received through the plurality of microphones 221*a* and 221*b*.

For example, the controller 270 may adjust the settings for audio output, by checking a difference in decibel dB between a frequency characteristic of the third test audio received through the plurality of microphones 221*a* and 221*b* and a reference frequency characteristic stored in the storage unit 240.

Figure 4:
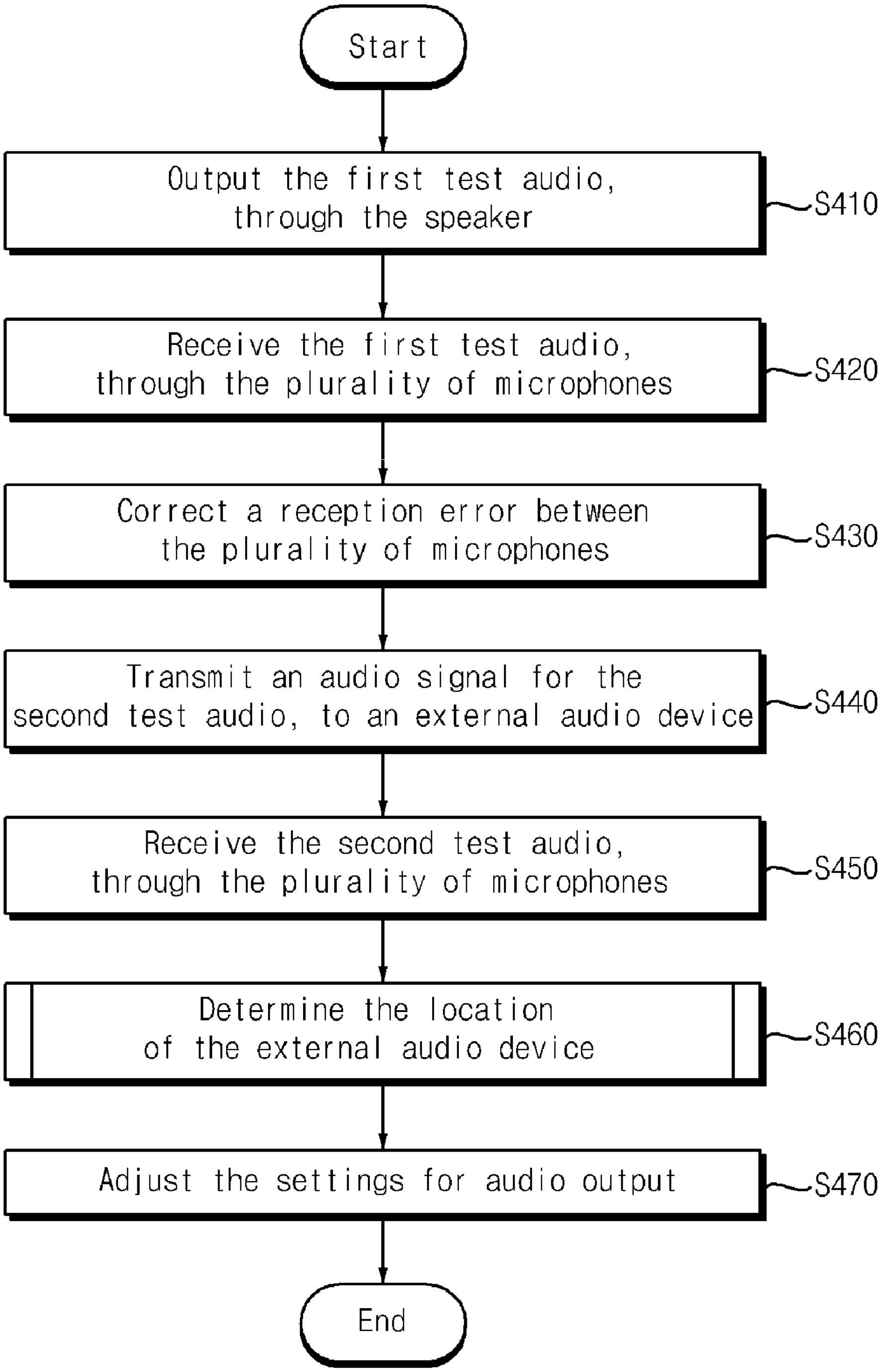
FIGS. 4 and 5 are flowcharts of a method of operating an audio device according to an embodiment of the present disclosure.
Figure 5:
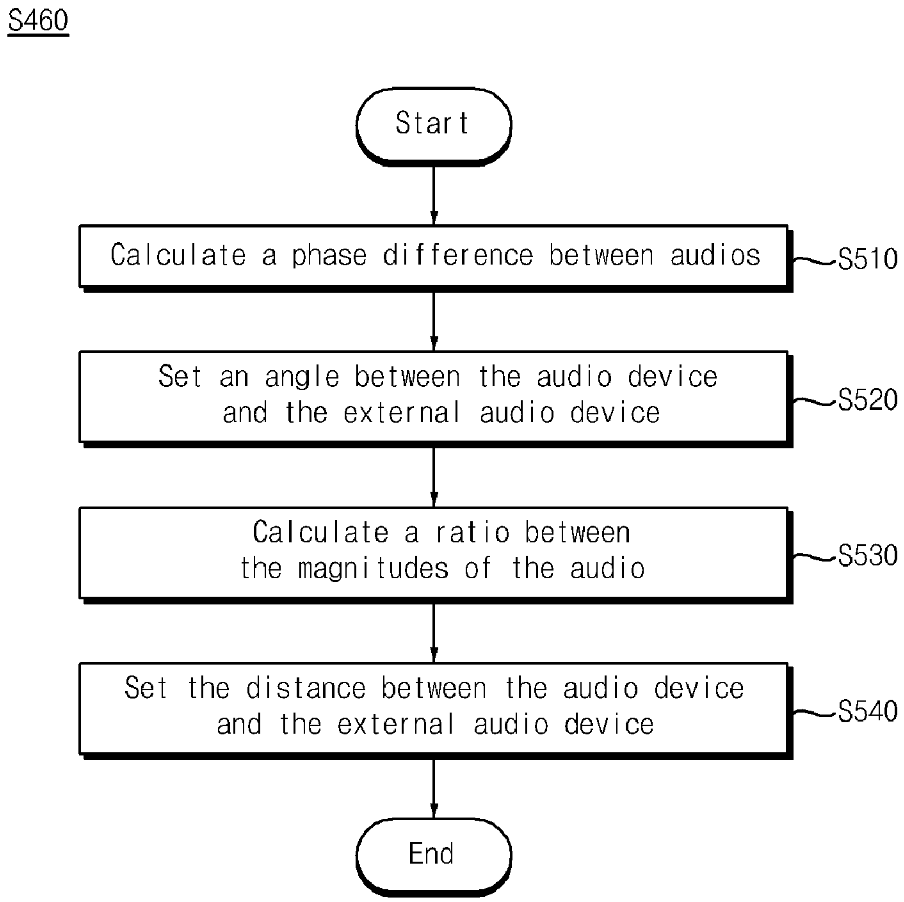

That is, the frequency characteristic of the third test audio received through the plurality of microphones 221*a* and 221*b* may vary according to the position of the sub audio device 120, 130. In this case, the audio system 100 may first determine the position of the sub audio device 120, 130 to determine optimal reference frequency characteristics according to the position of the sub audio device 120, 130, and thereafter, the settings for audio output may be adjusted based on the frequency characteristics of the third test audio received through the plurality of microphones 221*a* and 221*b*, thereby providing a more satisfactory quality of sound to a user. FIGS. 4 and 5 are flowcharts of a method of operating an audio device according to an embodiment of the present disclosure.

Referring to FIG. 4, at operation S410, the main audio device 110 may output the first test audio through any one of the speakers 211*a* to 212*b* included in the audio output unit 210. For example, the main audio device 110 may output the first test audio through the front center speaker 221*c*.

The main audio device 110 may receive the first test audio through the plurality of microphones 221*a* and 221*b*, at operation S420. For example, the main audio device 110 may receive the test audio through the plurality of microphones 221*a* and 221*b*, while the first test audio is output from the front center speaker 221*c*.

The main audio device 110 may correct a reception error between the plurality of microphones 221*a* and 221*b*, based on the first test audio received through the plurality of microphones 221*a* and 221*b*, at operation S430. For example, the main audio device 110 may compare the first test audio respectively received from the plurality of microphones 221*a* and 221*b* with each other, thereby correcting a reception error between the plurality of microphones 221*a* and 221*b* so that the audio reception times of the plurality of microphones 221*a* and 221*b* coincide with each other.

The main audio device 110 may transmit an audio signal for the second test audio to an external audio device, at operation S440. For example, the main audio device 110 may transmit an audio signal for the second test audio to the first sub audio device 120 among the sub audio devices 120 and 130 through the communication unit 230.

The main audio device 110 may receive the second test audio output from the external audio device through the plurality of microphones 221*a* and 221*b*, at operation S450.

At operation S460, the main audio device 110 may determine the location of the external audio device based on the second test audio received through the plurality of microphones 221*a* and 221*b*. For example, when transmitting an audio signal for the second test audio to the first sub audio device 120 among the sub audio devices 120 and 130, the main audio device 110 may determine the position of the first sub audio device 120, based on the second test audio received through the plurality of microphones 221*a* and 221*b*.

Referring to FIG. 5, at operation S510, the main audio device 110 may calculate a phase difference between the second test audios received through the plurality of microphones 221*a* and 221*b*. For example, the main audio device 110 may calculate a phase difference between the second test audios by converting the second test audio received through the plurality of microphones 221*a* and 221*b* from a time domain into a frequency domain through Fourier transform.

The main audio device 110 may determine an angle between the main audio device 110 and the external audio device, at operation S520. For example, when transmitting an audio signal for the second test audio to the first sub audio device 120 among the sub audio devices 120 and 130, the main audio device 110 may determine an angle between the main audio device 110 and the first sub audio device 120 according to a phase difference between the second test audios.

The main audio device 110 may calculate a ratio between the magnitudes of the second test audio received through the plurality of microphones 221*a* and 221*b*, at operation S530.

The main audio device 110 may determine the distance between the main audio device 110 and the external audio device, at operation S540. For example, when transmitting an audio signal for the second test audio to the first sub audio device 120 among the sub audio devices 120 and 130, the main audio device 110 may determine a regression equation corresponding to an angle between the main audio device 110 and the first sub audio device 120. In this case, the main audio device 110 may determine the distance between the main audio device 110 and the first sub audio device 120 by substituting a ratio calculated at operation S530 to the determined regression equation.

Figure 6:
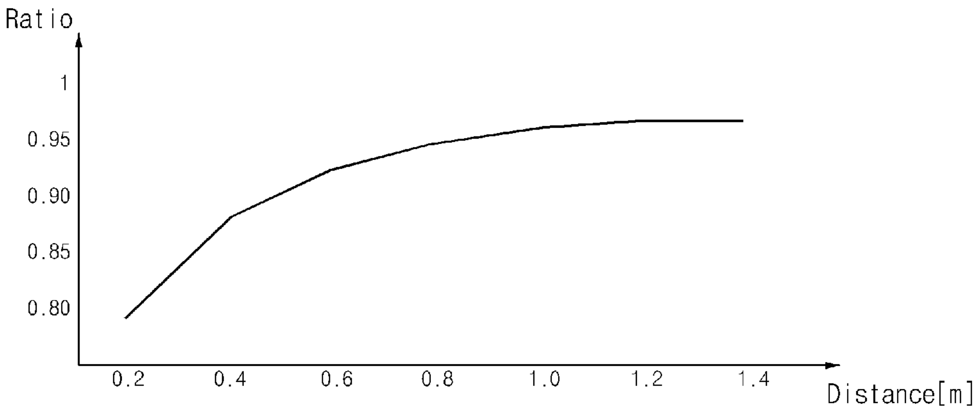
FIGS. 6 to 9 are diagrams for explaining the method of operating an audio device.

Referring to FIG. 6, it can be seen that as the distance between the main audio device 110 and the external audio device decreases, the ratio between the magnitudes of the second test audios received through the plurality of microphones 221*a* and 221*b* becomes smaller, and as the distance between the main audio device 110 and the external audio device increases, the ratio between the magnitudes of the second test audios approaches 1.

That is, the loudness of the sound is inversely proportional to the square of the distance, and since the plurality of microphones 221*a* and 221*b* are disposed by a certain distance, the distance between the plurality of microphones 221*a* and 221*b* and the external audio device may be different from each other, and the magnitudes of the second test audio received through the plurality of microphones 221*a* and 221*b* may also be different from each other. However, as the distance between the main audio device 110 and the external audio device increases, the distance between each of the plurality of microphones 221*a* and 221*b* and the external audio device becomes similar in such a manner that the separation distance between the plurality of microphones 221*a* and 221*b* can be ignored, so that the ratio between the magnitudes of the second test audio approaches 1.

Meanwhile, a ratio between the magnitudes of the second test audio received through the plurality of microphones 221*a* and 221*b* may also vary depending on an angle between the main audio device 110 and the external audio device.

Figure 7A:
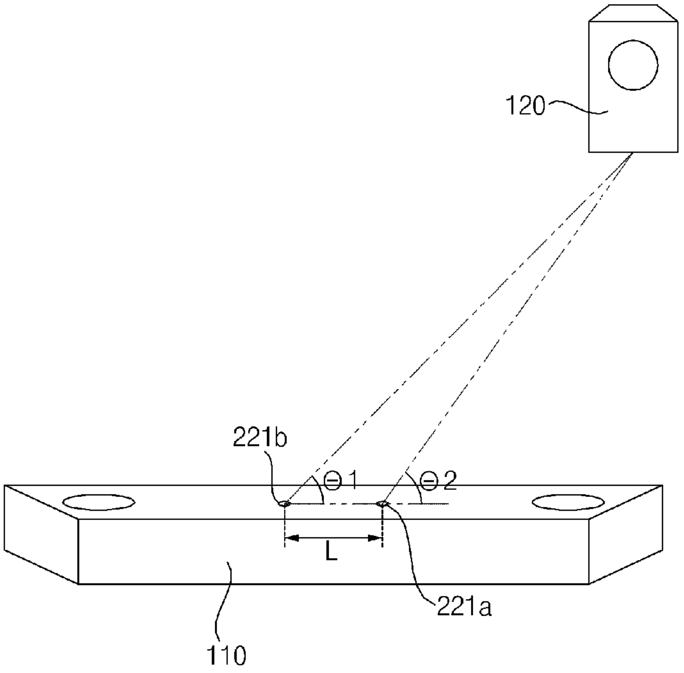
Figure 7B:
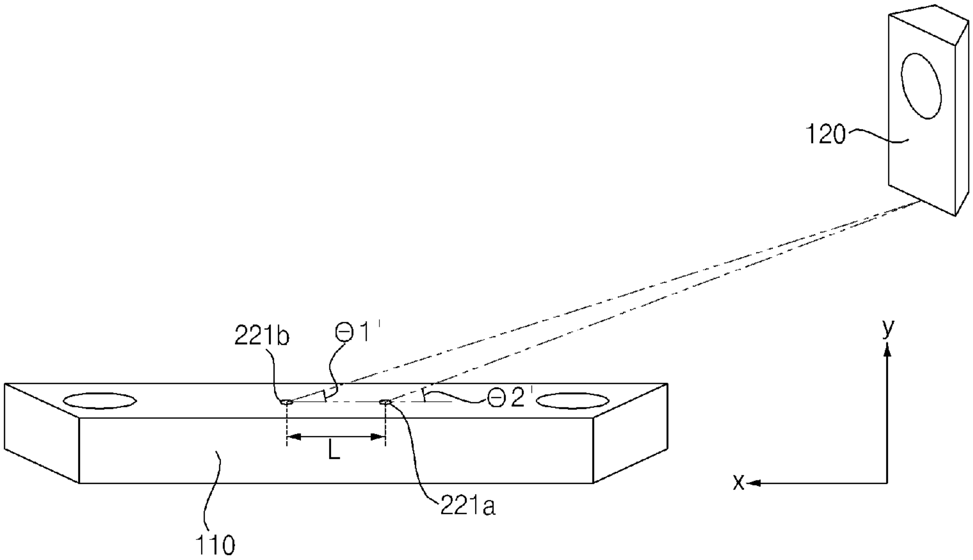

Referring to FIGS. 7A and 7B, the first sub audio device 120 may be freely disposed in various positions. In this case, according to the position where the first sub audio device 120 is disposed, the angle between the main audio device 110 and the external audio device, i.e., the angle between each of the plurality of microphones 221*a* and 221*b* and the first sub audio device 120 may also vary.

Figure 8:
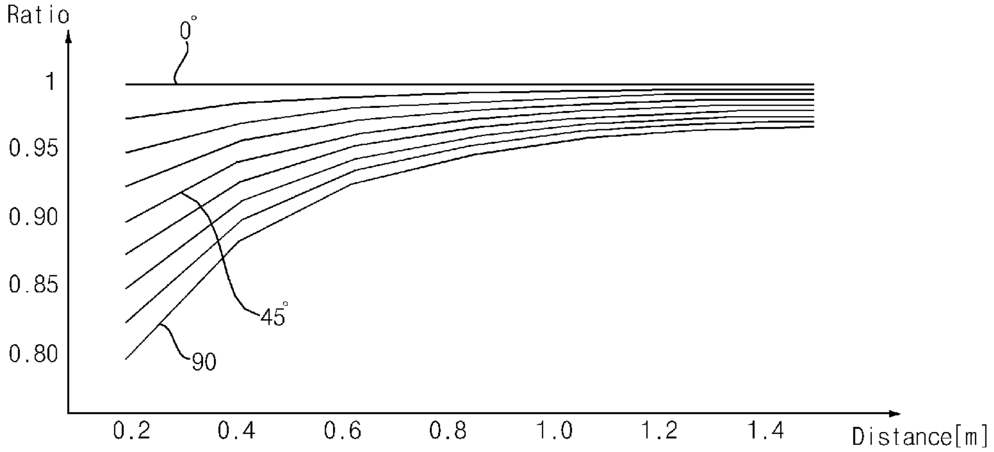

FIG. 8 is a graph of a ratio between the magnitudes of the second test audio received through the plurality of microphones 221*a* and 221*b*, when a case in which the external audio device is located in front of the main audio device 110 is set to 0°, and a case in which the external audio device is located along the length direction of the main audio device 110, i.e., a case in which the external audio device is located on a straight line where the plurality of microphones 221*a* and 221*b* are located is set to 90°.

Referring to FIG. 8, it can be seen that the ratio between the magnitudes of the second test audio received through the plurality of microphones 221*a* and 221*b* varies depending on the distance between the main audio device 110 and the external audio device, as well as the angle between the main audio device 110 and the external audio device.

More specifically, it can be seen that as the angle between the main audio device 110 and the external audio device increases, the change in the ratio between the magnitudes of the second test audio according to the change of the distance between the main audio device 110 and the external audio device increases.

Therefore, a regression equation corresponding to the angle between the main audio device 110 and the external audio device is determined by firstly determining the angle between the main audio device 110 and the external audio device, and the distance between the main audio device 110 and the external audio device may be accurately determined by putting the ratio between the magnitudes of the second test audio into the regression equation corresponding to the angle.

Meanwhile, referring again to FIG. 4, at operation S470, the main audio device 110 may adjust the settings for audio output, based on the position of the sub audio device 120, 130. In this case, when the positions of the sub audio device 120, 130 are all determined, the main audio device 110 may adjust the settings for audio output.

For example, the main audio device 110 may transmit an audio signal for the third test audio to the sub audio device 120, 130 through the communication unit 230, and output the audio signal also through the audio output unit 210. In this case, the main audio device 110 may receive the third test audio through the plurality of microphones 221*a* and 221*b*, and may adjust the settings for audio output based on a frequency characteristic of the third test audio received through the plurality of microphones 221*a* and 221*b*.

Figure 9:
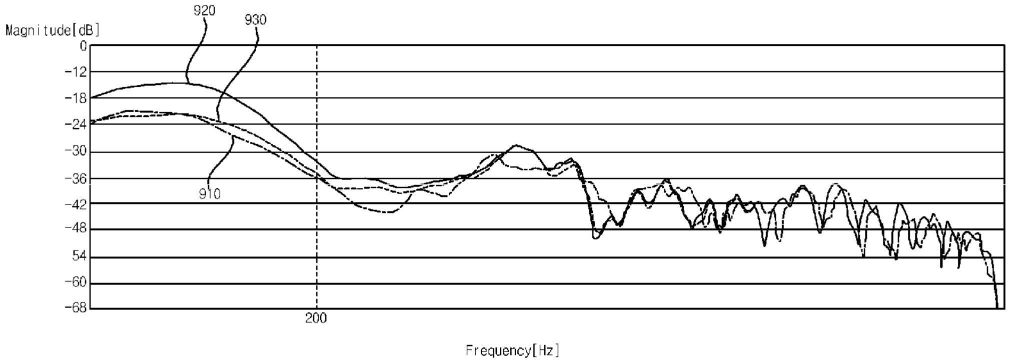

As shown in FIG. 9, when the settings for audio output is adjusted according to the difference between a preset reference frequency characteristic 910 and the frequency characteristic 920 of the third test audio received through the plurality of microphones 221*a* and 221*b*, the frequency characteristic 930 of the third test audio after adjustment may be closer to the reference frequency characteristic 910.

At this time, according to the graph shown in FIG. 9, in the case of a low range (e.g. a band of 200 Hz or less) of a certain frequency or less, it can also be seen that the sound quality is significantly changed by the influence of the environment in which the audio system 100 is installed compared to the mid/high range, and there is little variation in sound quality according to user's location, and in consideration of this point, the main audio device 110 may first adjust the settings for the audio output of the low range (e.g. the band of 200 Hz or less).

As described above, according to various embodiments of the present disclosure, even if an external microphone is not separately provided, the location of the external audio device (e.g. the sub audio device 120, 130) is accurately determined by using the plurality of microphones 221*a* and 221*b* built in the main audio device 110, and settings for audio output can be accurately adjusted in consideration of the location of the external audio device, thereby improving price competitiveness and ease of use of the product.

The accompanying drawings are used to assist in easy understanding of various technical features and it should be understood that the embodiments presented herein are not limited by the accompanying drawings. As such, the present disclosure should be construed to extend to any alterations, equivalents and substitutes in addition to those which are particularly set out in the accompanying drawings.

Meanwhile, a method of operation of an audio device of the present disclosure can also be embodied as processor readable code on a processor-readable recording medium provided in the audio device. The processor-readable recording medium includes all kinds of recording apparatuses storing data that can be read by a processor. Examples of the processor-readable recording medium is ROM, RAM, CD-ROM, magnetic tapes, floppy disks, optical data storage apparatuses, and, including those that are implemented in the form of carrier waves such as data transmission through the Internet. In addition, the processor-readable recording medium is dispersed in computer systems connected through a network, the code that is read by the processor can be stored and executed in a distributed fashion.

In addition, in the above, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. An audio device comprising:
- a speaker;
- a plurality of microphones; and
- a controller configured to:
  - control the plurality of microphones to receive audio output from an external audio device,
  - determine an angle between the audio device and the external audio device, based on a phase difference between the audio received by the plurality of microphones,
  - calculate a ratio between magnitudes of the audio received by the plurality of microphones,
  - determine a distance between the audio device and the external audio device, based on a regression equation corresponding to the determined angle and the calculated ratio, and
  - adjust a setting for an audio output from at least one of the external audio device and the speaker, based on the determined angle and the determined distance.

2. The audio device of claim 1, wherein the setting for the audio output includes a low range of a certain frequency or less.

3. The audio device of claim 1, wherein the controller is configured to apply a Fourier transform to the audio received by the plurality of microphones from a time domain to a frequency domain, to calculate the phase difference.

4. The audio device of claim 1, wherein the controller is further configured to:
- output a first test audio through the speaker,
- control the plurality of microphones to receive the first test audio while the test audio is output, and
- correct a reception error between the plurality of microphones, based on a signal corresponding to the first test audio received from the plurality of microphones.

5. The audio device of claim 4, further comprising a communication assembly for communicating with the external audio device,
- wherein the controller is further configured to:
  - transmit a first audio signal for a second test audio to the external audio device through the communication assembly, and
  - determine a location of the external audio device, based on a signal corresponding to the second test audio received from the plurality of microphones.

6. The audio device of claim 5, wherein the controller is further configured to:
- transmit a second audio signal for a third test audio to the external audio device through the communication assembly,
- output the third test audio through the speaker, and
- adjust the setting for the audio output, based on the location of the external audio device and a signal corresponding to the third test audio received from the plurality of microphones.

7. The audio device of claim 6, wherein the controller is further configured to adjust the setting for audio output by checking a difference in decibels between a frequency characteristic of the third test audio received through the plurality of microphones and a reference frequency.

8. A method of operating an audio device, the method comprising:
- receiving an audio output from an external audio device, through a plurality of microphones included in the audio device;
- determining an angle between the audio device and the external audio device, based on a phase difference between the audio received by the plurality of microphones;
- calculating a ratio between magnitudes of the audio received by the plurality of microphones,
- determining a distance between the audio device and the external audio device, based on a regression equation corresponding to the determined angle and the calculated ratio, and
- adjusting, by the controller, a setting for an audio output from at least one of the external audio device and a speaker included in the audio device, based on the determined angle and the determined distance.

9. The method of claim 8, wherein the setting for the audio output includes a low range of a certain frequency or less.

10. The method of claim 8, further including applying a Fourier transform to the audio received by the plurality of microphones from a time domain to a frequency domain, to calculate the phase difference.

11. The method of claim 8, further including:
- outputting a first test audio through the speaker,
- controlling the plurality of microphones to receive the first test audio while the test audio is output, and
- correcting a reception error between the plurality of microphones, based on a signal corresponding to the first test audio received from the plurality of microphones.

12. The method of claim 11, wherein the audio device further comprises a communication assembly for communicating with the external audio device, and
- wherein the method further includes:
  - transmitting a first audio signal for a second test audio to the external audio device through the communication assembly, and
  - determining a location of the external audio device, based on a signal corresponding to the second test audio received from the plurality of microphones.

13. The method of claim 12, further including:
- transmitting a second audio signal for a third test audio to the external audio device through the communication assembly,
- outputting the third test audio through the speaker, and
- adjusting the setting for the audio output, based on the location of the external audio device and a signal corresponding to the third test audio received from the plurality of microphones.

14. The method of claim 13, wherein the adjusting the setting for audio output is performed by checking a difference in decibels between a frequency characteristic of the third test audio received through the plurality of microphones and a reference frequency.

* * * * *